May 9, 1950    G. VOISIN    2,506,693
CONNECTING ROD SYSTEM FOR CRANKSHAFTS
Filed Dec. 4, 1947    2 Sheets-Sheet 1

INVENTOR
GABRIEL VOISIN,
by
John B. Brady
ATTORNEY

May 9, 1950 — G. VOISIN — 2,506,693
CONNECTING ROD SYSTEM FOR CRANKSHAFTS
Filed Dec. 4, 1947 — 2 Sheets-Sheet 2
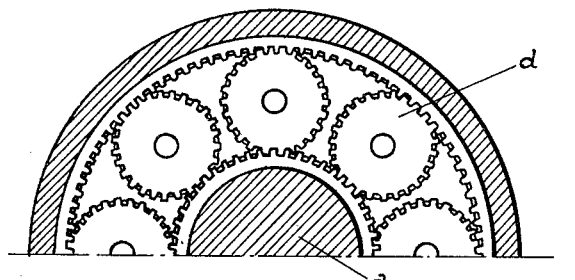
Fig. 2.
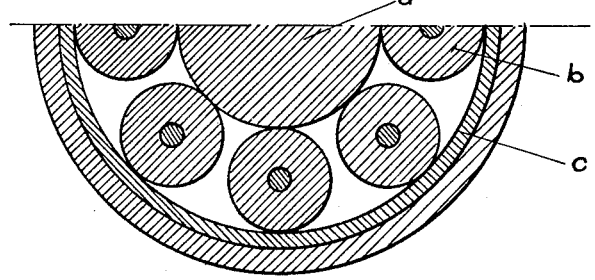
Fig. 3.
Fig. 4.
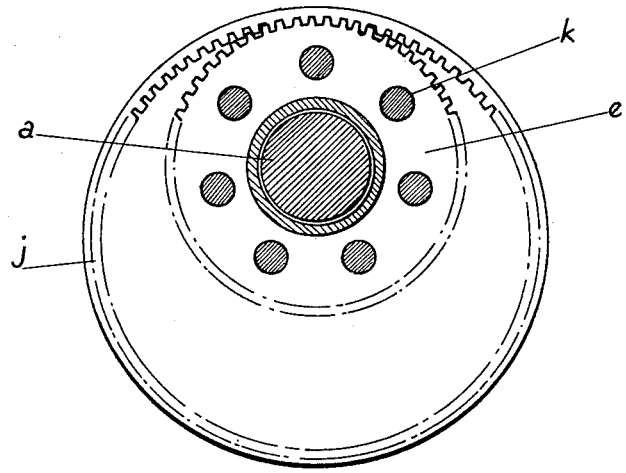
INVENTOR
GABRIEL VOISIN,
By John Q. Brady
ATTORNEY Patented May 9, 1950

2,506,693

UNITED STATES PATENT OFFICE 2,506,693

CONNECTING ROD SYSTEM FOR CRANKSHAFTS

Gabriel Voisin, Paris, France

Application December 4, 1947, Serial No. 789,676
In France December 4, 1946

2 Claims. (Cl. 74—52)

1

This invention relates to a device for connecting the elements of a crank-shaft roller bearing with the elements of an assembly comprising a master connecting-rod and multiple articulated connecting-rods for pistons arranged radially around a crank-shaft.

The present device may be utilized in any system in which, to one and the same crank-pin, are coupled a plurality of driving or receiving elements, such as engines, pumps, compressors or transformers.

My invention is described in detail in the specification hereinafter following by reference to the accompanying drawings in which:

Fig. 2 is a fragmentary vertical section taken substantially on line 2 of Fig. 1;

Fig. 3 is a fragmentary vertical section taken substantially on line 3 of Fig. 1; and Fig. 4 is a fragmentary vertical section taken substantially on line 4 of Fig. 1.

Figure 1:
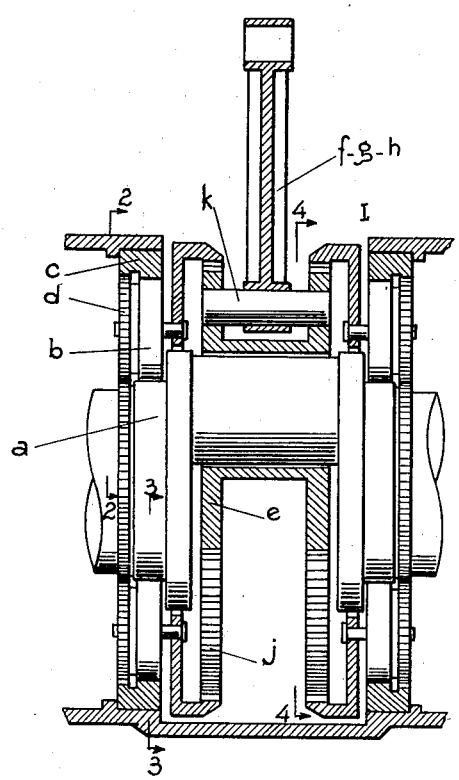
Figure 1 is a fragmentary vertical sectional view with certain of the parts shown in elevation through a connecting system for crank-shafts in accordance with my invention.

The mechanisms ordinarily employed when the number of connecting-rods coupled together on the crank-pin or crank-pins of a crank-shaft is greater than two are in general, of the master connecting-rod and articulating connecting-rod assembly type either of the kind comprising a master connecting-rod and subsidiary connecting-rods or links articulated thereto or of what is known as the type with grooves.

The type comprising a master connecting-rod has the following disadvantages:

(1) Of preventing the use of crank-pins or devices of large diameter such as are desirable for the purpose of ensuring the maximum strength of the system. In point of fact the size of the device removes far from the centre of the master connecting-rod the axes of articulation of the secondary connecting-rods, which thus become very short, and assume, when in operation, prohibitive obliquities.

(2) Of transmitting to the master connecting-rod parasitic torques due to the forces transmitted by the secondary connecting-rods, these torques being the greater according as their attachments are more distant from the centre of the master connecting-rod.

(3) Of determining elliptical trajectories of the axes of attachment to the master connecting-rod, which trajectories comprise the balancing of the assemblage and modify the stroke of the pistons in relation to one another.

2

The arrangement known as the type with grooves consists of a turning member, generally turning on the crank-pin, and bearing one or more superposed grooves receiving the support of the connecting-rods which terminate at the side of the crank-pin in the form of a concentric skid.

This arrangement has the following disadvantages:

(1) Of rendering it difficult to employ rotary devices of large diameter, which dangerously augment the circular slipping of the skids;

(2) Of creating parasitic torques in the slipping of the skids, which tend to jam in the grooves under the action of the alignment towards the centre of the crankpin.

The device that forms the subject of the present invention obviates all these disadvantages. In point of fact it renders it possible to place upon the crank-pin of the crank-shaft a bobbin-like ring to which are attached the subsidiary connecting-rods or links, in such a way that the axes of articulation of the said links to the ring describe a trajectory strictly identical with that of the crank-pin of the crank-shaft.

The invention is illustrated by way of example in the accompanying drawings, the embodiment illustrated comprising the following elements:

(1) A positively controlled roller bearing as described in French Patent No. 911,385, comprising an inner roller race $a$, rollers $b$, and an outer roller race $c$. As described in the specification of my said French Patent No. 911,385, the rollers $b$ are toothed at $d$, the pitch diameter of these rings of teeth $d$ coinciding with the rolling diameter of the rollers $b$. These teeth $d$ mesh on the one hand with external teeth on the inner race $a$, and on the other hand with internal teeth on the outer race $c$.

(2) A bobbin-like ring $e$, which is capable of turning about the crank-pin of the crank-shaft, and to which are attached the subsidiary connecting-rods or links $f$, $g$, $h$, the number of which is not limited.

(3) A connection between the ring $e$, the crank-shaft and a casing, ensuring for the ring $e$ such a displacement in space that one of its axes remains constantly parallel to its original direction. This connection is established by means of external gear teeth $i$ on the ring $e$, meshing with a ring of internal teeth $j$ on a member which is itself rigid with the pivots of the rollers $b$.

The gears as a whole thus described constitute a double train of epicyclic gears, the reduction ratio of which is so selected that the rotation of the crank-shaft impresses upon the ring $e$ a rotation around the crank-pin of a speed equal to that of the crank-shaft but in the opposite direction.

Under these conditions the trajectory of any joint of the ring, and in particular that of the pivots $k$ of the articulations of the links, is a circle of the same diameter as that described by the centre of the crank-pin.

I claim:

1. A connecting-rod system comprising a crank-shaft, a crank-pin, pistons arranged radially around the crank-shaft, connecting-rods connected individually to the pistons, an epicyclic gear including a toothed frame member, toothed planet pinions carried by the frame member, teeth on the crank-shaft meshing with the planet pinions, a stationary ring of teeth also meshing with the planet pinions, and a toothed ring rotatably mounted on the crank-pin and meshing with the toothed frame member of the epicyclic gear, the connecting-rods being attached to this ring, a roller bearing supporting the crank-shaft on the side of said epicyclic gear, the rollers of this bearing being of the same diameter as the pitch circles of the planet pinions, and each roller being rigidly and co-axially secured to one of the said planet pinions, an inner race on the crank-shaft engaging the bearing rollers and having a diameter equal to the diameter of the pitch circle of the teeth on the crank-shaft, and a stationary outer race engaging the bearing rollers and having a diameter equal to the diameter of the pitch circle of the stationary ring of teeth, and the diameters of the toothed members being such that the speed of revolution of the ring will be zero whatever the speed of revolution of the crank-shaft may be.

2. A connecting-rod system comprising a crank-shaft, a pair of cranks, a crank-pin carried by the cranks, pistons arranged radially around the crank-shaft, connecting-rods connected individually to the pistons, two epicyclic gear trains, one on each side of the pair of cranks, each of these epicyclic gear trains including a toothed frame member, toothed planet pinions carried by the frame member, teeth on the crank-shaft meshing with the planet pinions, and a stationary ring of teeth also meshing with the planet pinions, a toothed ring mounted on the crank-pin and meshing with the toothed frame members of both the epicyclic gear trains, the connecting-rods being attached to this ring, roller bearings supporting the crank-shaft, the rollers of these bearings being of the same diameter as the pitch circles of the planet pinions, and each roller being rigidly and co-axially secured to one of the said planet pinions, an inner race on the crank-shaft engaging the bearing rollers on each side of the cranks, the diameter of the inner races being equal to the diameter of the pitch circle of the teeth on the crank-shaft, and a stationary outer race engaging the bearing rollers on each side of the cranks, the diameter of the outer races being equal to the diameter of the pitch circle of the stationary ring of teeth, and the diameters of the toothed members being such that the speed of revolution of the ring will be zero whatever the speed of revolution of the crank-shaft may be.

GABRIEL VOISIN.

REFERENCES CITED

The following references are of record in the file of this patent:

UNITED STATES PATENTS

| Number | Name | Date |
| --- | --- | --- |
| 1,863,667 | Miranda | June 21, 1932 |
| 2,185,902 | Schubert | Jan. 2, 1940 |
| 2,199,625 | Fiala-Fernbrugg | May 7, 1940 |
| 2,223,100 | Foster | Mar. 26, 1940 |
| 2,332,323 | Krotzer | Oct. 19, 1943 |